United States Patent [19]

Coburn

[11] 4,237,761

[45] * Dec. 9, 1980

[54] HEAD LOCKING MEANS FOR SLITTER SCORER

[75] Inventor: Robert E. Coburn, Warminster, Pa.

[73] Assignee: Molins Machine Company, Inc., Cherry Hill, N.J.

[ * ] Notice: The portion of the term of this patent subsequent to Jul. 31, 1996, has been disclaimed.

[21] Appl. No.: 908,608

[22] Filed: May 23, 1978

Related U.S. Application Data

[63] Continuation-in-part of Ser. No. 814,749, Jul. 11, 1977, Pat. No. 4,162,643.

[51] Int. Cl.³ .................... B23D 19/06; B23D 35/00

[52] U.S. Cl. .................................... 83/665; 83/499; 83/504; 403/5

[58] Field of Search ............. 83/499, 498, 504, 508.2, 83/508.3, 665, 700; 93/58.2 R; 403/5

[56] References Cited

U.S. PATENT DOCUMENTS

| | | | |
|---|---|---|---|
| 1,297,809 | 3/1919 | Dixon | 242/72 R |
| 2,989,328 | 6/1961 | Nitchie | 403/5 |
| 3,302,506 | 2/1967 | Turner et al. | 83/665 |
| 3,422,714 | 1/1969 | VanGompel | 83/665 X |
| 3,782,234 | 1/1974 | Rodach | 83/665 |
| 3,886,833 | 6/1975 | Gunn | 83/499 |
| 3,951,024 | 4/1976 | Weiskopf | 83/498 |
| 4,006,671 | 2/1977 | Ochs | 83/665 X |
| 4,162,643 | 7/1979 | Coburn | 83/665 |

*Primary Examiner*—J. M. Meister
*Attorney, Agent, or Firm*—Seidel, Gonda, Goldhammer & Panitch

[57] ABSTRACT

A corrugated paperboard slitter scorer has slitting and scoring heads movable individually or as a group along an expandable shaft by way of a master shifter. The expandable shaft provides a friction drag to maintain a head in position until all heads are simultaneously locked to the shaft.

11 Claims, 5 Drawing Figures

HEAD LOCKING MEANS FOR SLITTER SCORER

RELATED CASE

This application is a continuation-in-part of application Ser. No. 814,749 filed July 11, 1977 now U.S. Pat. No. 4,162,643 and entitled "Head Locking Means for Automatic Slitter Scorer".

BACKGROUND

Automatic slitter scorers which include either a computer or miniprocessor have been proposed heretofore. See U.S. Pat. Nos. 3,651,723 and 4,010,677. Other prior art directed to automated slitter scorers include U.S. Pat. Nos. 3,961,547; 3,646,418; 3,831,502; 3,422,714; and 3,587,374. In such slitter scorers, heads are moved along a shaft to a predetermined position and then are secured to the shaft for rotation therewith. It is known to simultaneously couple the shaft to all of the operative heads as per U.S. Pat. Nos. 3,951,024 and 4,006,671 instead of coupling each head individually to the shaft.

One problem with the prior art is inadvertent shifting of heads predisposed along a shaft due to vibration or the like prior to the heads being fixedly secured to the shaft. The problem is not solved by simultaneously expanding a portion of the shaft into locking engagement with the heads as taught by patent 3,951,024 and 4,006,671. Thus, the last two mentioned patents do not take into consideration inadvertent shifting of a head prior to the time when all heads are purportedly in their desired position and then simultaneously coupled to the shaft.

The present inventon solves the above-mentioned problems of the prior art as well as other problems which will be made clear hereinafter.

SUMMARY OF THE INVENTION

The present invention includes a shaft or a pair of parallel shafts with a plurality of heads on the shafts. A means is provided for selectively positioning the heads at preselected locations along their shafts. An adjusting means and a lock means are provided on each of the shafts. The locking means includes an elongated expandable chamber means extending along a central portion of said shaft for simultaneously locking all heads to said shaft when said chamber means is pressurized and a friction drag surface projecting in a radial direction with respect to the periphery of said shaft for a predetermined distance into contact with said heads. The friction drag surface has a flat thereon.

The adjusting means is independent from said locking means for preventing inadvertent movement of the heads relative to the shaft when said locking means is unpressurized and includes means for adjusting the radial distance of the outer periphery of said drag surface relative to the longitudinal axis of said shaft so that said drag surface may project beyond the periphery of said shaft while said locking means is unpressurized.

It is an object of the present invention to provide an automatic slitter scorer with means for retaining heads in any predetermined position along a shaft to prevent inadvertment movement of the head prior to all heeads being simultaneously locked to the shaft.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
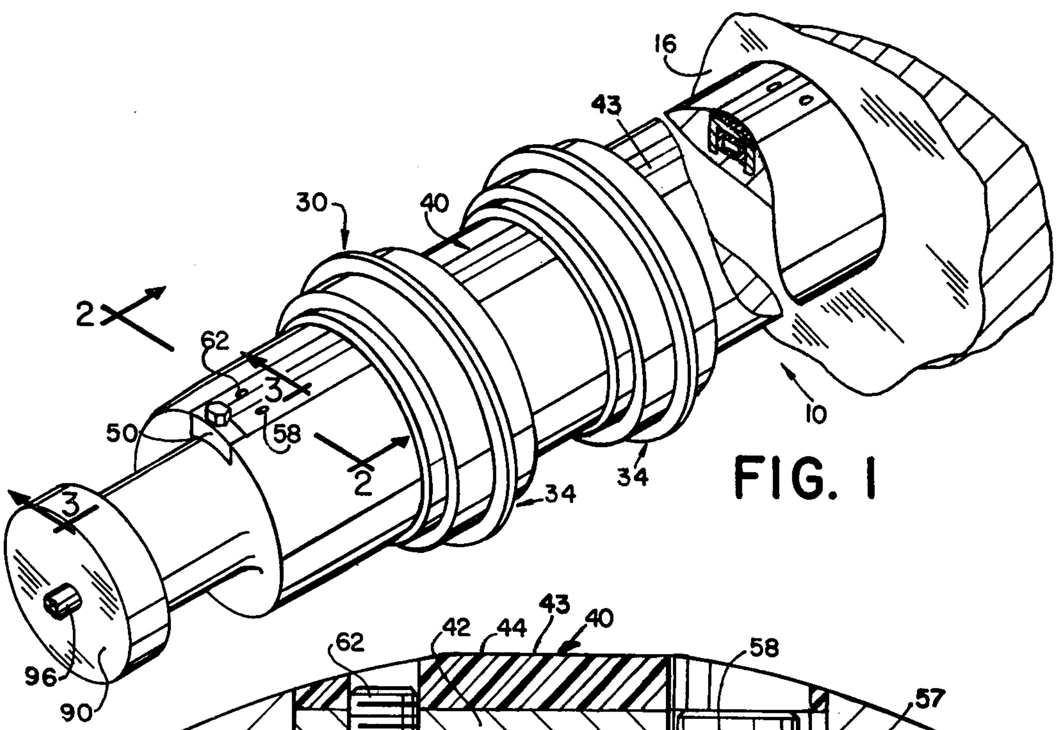
FIG. 1 is a partial perspective view of a shaft having heads thereon.

Referring to the drawings in detail, wherein like numerals indicate like elements, there is shown in FIG. 1 a portion of a slitter scorer in accordance with the present invention designated generally as 10. The slitter scorer 10 is conventionally positioned between the discharge end of the rotary shear and the inlet end of the cut-off.

A web such as a web of corrugated paperboard is supported as it moves from the discharge end of the rotary shear to the apparatus 10 by way of a web table.

Frame 16 supports the ends of an upper head support shaft 30 and a lower head support shaft 32 which are parallel to one another and horizontally disposed. Each of the shafts 30, 32 has a plurality of slitting heads or scoring heads or a mixture thereof thereon. Thus, for purposes of illustration, shaft 30 has slitting heads 34 thereon. Shaft 32 has an equal number of mating heads.

Figure 2:
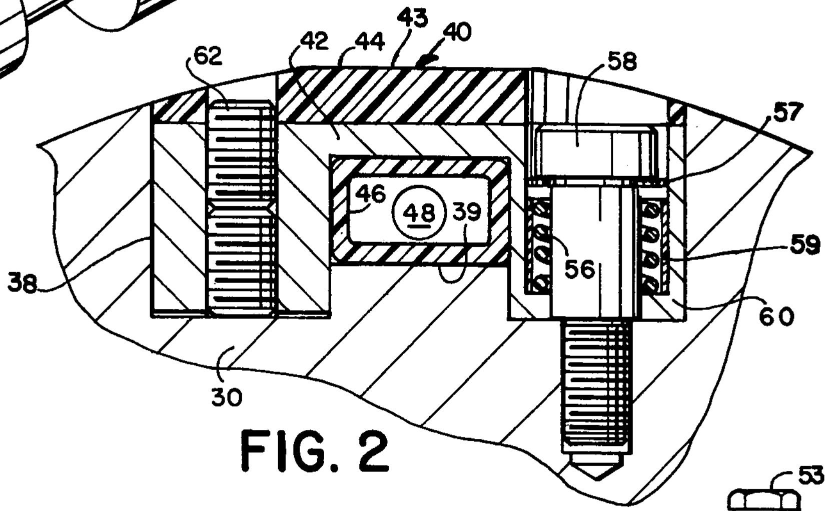
FIG. 2 is an enlarged sectional view taken along the line 2—2 in FIG. 1.
Figure 3:
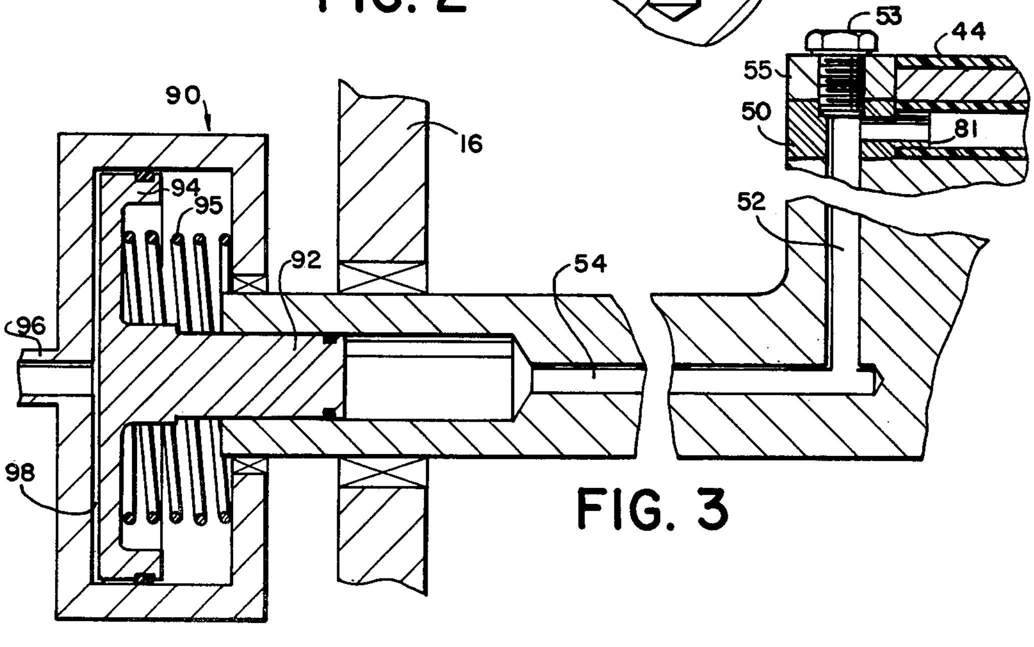
FIG. 3 is an enlarged sectional view taken along the line 3—3 in FIG. 1.

The shafts 30 and 32 are constructed in a similar manner. Hence, only shaft 30 will be described in detail. Referring to FIG. 2, it will be noted that shaft 30 has a longitudinally extending groove 38 which is occupied by a retaining and lock means 40. The base of the groove 38 is formed of three parallel surfaces, the center one forming a ridge portion 39 above the two adjoining surfaces. The retaining means 40 is piloted by the sides of the ridge portion 39 for reciprocal radial movement.

Means 40 includes a metal insert body 42 disposed within the groove 38. The outer periphery of the body 42 is provided with a covering 44 of a suitable material such as polyurethane or some other polymeric plastic material which is an elastomer having good memory and approximately 50 durometer. Covering 44 has a flat 43 and is preferably molded to metal body 42. When shaft 30 has a diameter of $6\frac{1}{2}$ inches, flat 43 is $\frac{1}{2}$ to $\frac{3}{4}$ inches wide. A tube 46, preferably rectangular in cross-section, is disposed between the ridge portion 39 in the groove 38 and a recess in the body 42. Tube 46 is closed at one end and has an inlet port 48 at its other end which is molded to extension 81 on metal adapter 50.

The inlet port 48 of the tube 46 communicates with a flow passage 52 in shaft 30. Adaptor 50 may contain an air bleed valve 53 and is secured to a reduced diameter portion of the shaft 30 by clamp 55. Conventional O-ring seals on opposite sides of adaptor 50 are not shown. Passage 52 is connected to a supply and exhaust conduit 54. Tube 46 is made from an elastomeric material such as rubber whereby it will expand when inflated by a pressurized motive fluid such as air or an oil.

The body 42 is spring biased radially inward by spring 56. Spring 56 extends between washer 57 which is on a cap screw 58 and a shoulder 60 on the body 42. The spring 56 surrounds a shank on the screw 58. Screw 58 is threaded into a tapered hole in the shaft 30. The minimum radial position of the means 40 is adjustably determined by a set screw 62 carried by the body 42. Set screw 62 can be threaded inwardly so as to bottom against a surface on the bottom of groove 38. It will be appreciated that the screw 48 and set screw 62 are disposed within drilled holes in the insert body 42 adjacent opposite ends thereof.

A ring 59 surrounds spring 56 and is spaced from washer 57 to thereby define the limit of adjustment for covering 44. When ring 59 contacts washer 57, covering 44 is at its outermost position. A shoulder on body 42 could be used in place of ring 59.

A master shifter 64 is guided for movement along the path parallel to the longitudinal axis of shafts 30, 32 by way of rods 66, 68 which extend between the frames 16. The master shifter 64 is propelled along the rods 66, 68 in opposite directions in any suitable manner such as by way of a threaded rod 70 threadedly coupled to the master shifter 64 and driven by one of motors 73, 75 having clutch 79 therebetween. Motor 73 is a large high speed motor such as 1 Hp for moving master shifter 64 at a high speed such as 10 cm/sec while motor 75 is a small motor such as ¼ Hp for moving shifter 64 at a slow rate such as 0.6 cm/sec. Encoder 81 on rod 70 is coupled to the computer which in turn is coupled to the clutch 79. Per se, such clutch, computer and motors are well known in the art.

The master shifter 64 has legs 72, 74 depending therefrom so that each of the shafts 30, 32 is disposed between said legs 72, 74. Fingers 76 and 78 are supported by the legs 72, 74, respectively on opposite sides of the shaft 30 for shifting heads along the shaft 30. Likewise, fingers 80, 82 are supported by the legs 72, 74, respectively on opposite sides of the shaft 32 for shifting heads therealong. As the master shifter 64 moves along its guide rods 66, 68, it may cause the heads on shafts 30 and/or the heads on shaft 32 to be shifted along their respective shafts depending upon the position of the fingers 76–82.

Figure 4:
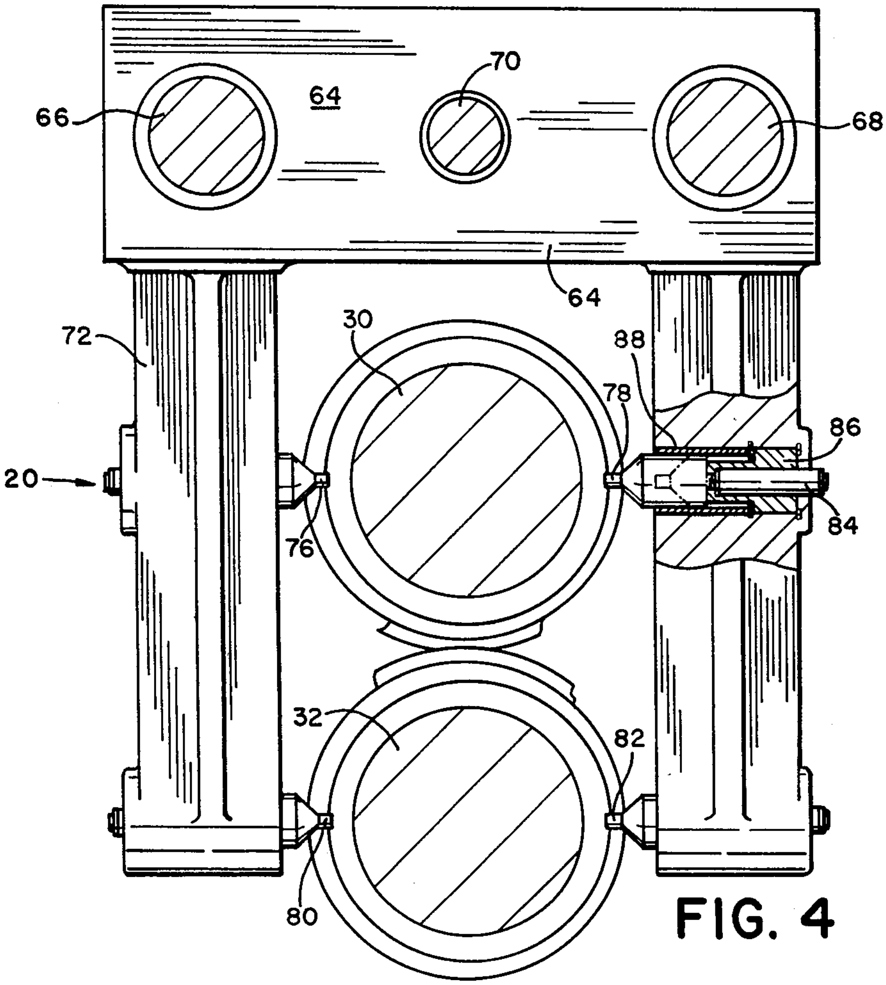
FIG. 4 is a sectional view taken along the shaft with a portion of the master shifter being broken away for purposes of illustration.
Figure 5:
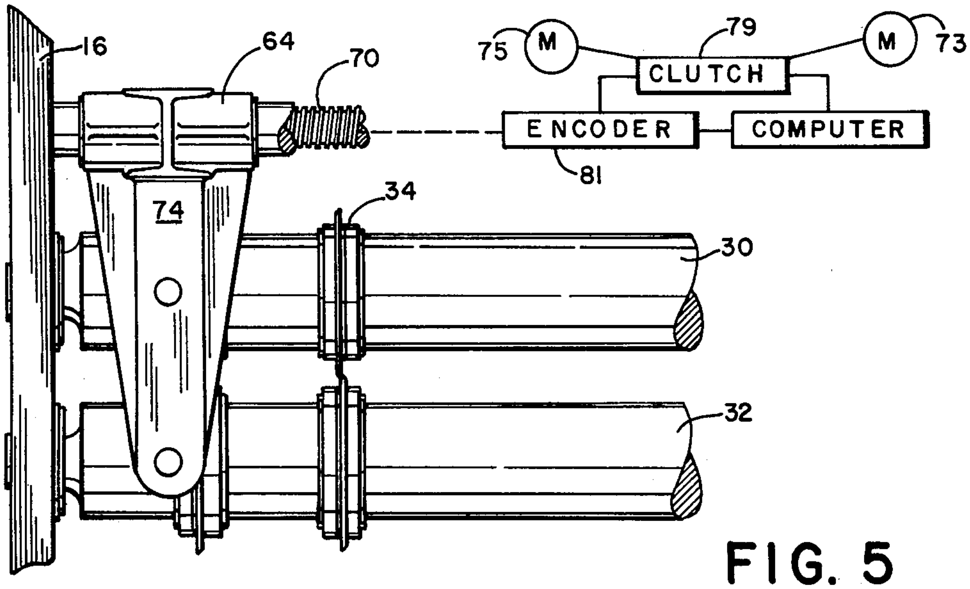
FIG. 5 is a side elevation view of the structure shown in FIG. 4.

The fingers 76–82 are shown in FIG. 4 in their operative position. Since all of the fingers are identical, only finger 78 will be described in detail. The inoperative position of finger 78 is shown in phantom in FIG. 4. A motor such as a pneumatic cylinder is supported by the legs 74 to move the finger 78 between its operative and inoperative positions.

A pneumatic cylinder 84 is supported by a cylinder support 86 which in turn is secured within a portion of a transverse bore in the leg 74. The remainder of the bore is occupied by sleeve bearing 88. A piston rod interconnects a piston within cylinder 84 and the finger 78. The finger 78 has a cylindrical skirt which is guided by the bearing 88 and partially surrounds the cylinder 84 in the inoperative position of the finger 78. In this manner, the finger 78 can have a stroke of 1 to 1½ inches when moved between its operative and inoperative positions. The fingers 76–82 engage a side face of the heads when they move the heads along their respective shafts. While the motor for the fingers is preferably a pneumatic cylinder, other equivalent devices such as a solenoid may be utilized.

Conduit 54 disposed along the axis of shaft 30 is connected to a pressure intensifier 90 having a first piston 92 and a coaxial second piston 94. Piston 94 is substantially larger in diameter than piston 92. I prefer to make piston 94 about four times as large as piston 92 so as to cause piston 92 to transmit a force 16 times as great as the force applied to piston 94. Pistons, 92, 94 are biased away from passage 52 by spring 95. Passage 96 communicates with chamber 98 for selectively supplying motive fluid of sufficient pressure to overcome the bias of spring 95 and cause piston 92 to intensify the pressure of the hydraulic fluid used to expand tube 46.

The general sequence of events for changing the position of the heads 34 is as follows. Tube 46 is exhausted. The master shifter 64 moves from one end of the shaft 30 to the other so that all of the heads are moved to one end of the shaft 30.

The fingers 76–82 on the master shifter 64 are then retracted. Thereafter, the master shifter 64 moves and distributes the heads 34 to the new position for the next production order.

As the master shifter 64 moves, it pushes all of the heads in front of it until the last head reaches its predetermined position. At that point, the master shifter stops and the fingers 76–82 are retracted. Then the master shifter moves forward through a distance corresponding to the thickness of the last head at which point the fingers are then extended. Thereafter, the master shifter 64 continues to push the remainder of the heads until the then existing last head reaches its predetermined position. The sequence is then repeated until all of the operative heads have been disposed along their predetermined position. The remaining heads in front of the master shifter 64 are then pushed to one side and will remain operative. Thereafter, tube 46 is expanded to lock the heads.

The slitter heads 34 are maintained in their predetermined position due to the frictional drag between the covering 44 and the inner diameter of the heads. The flat 43 results in a small open zone at the bore of the head to accommodate deformation of covering 44 whose frictional characteristics are enhanced when distorted. The set screws 62 will be adjusted so as to cause the exposed surface of covering 44 to project beyond the periphery of the shaft 30 for a sufficient distance such as 0.002 to 0.01 inches so as to maintain any slitter head in a predetermined position as deposited by the master shifter 64.

A liquid such as oil is pressurized by piston 92 and is introduced into tube 46 at a high pressure such as 1,000 psi to cause the tube 46 to expand against the pressure of springs 56 and simultaneously lock all of the heads to their respective shafts. In its collapsed and in its expanded position, the tube 46 is completely encased and confined by mutually perpendicular walls of body 42 and groove 38. My preferred locking pressure is 625 lbs/linear inch of body 42. Means 40, by way of covering 44, maintains any slitter head or cutter head in a predetermined position so as to prevent inadvertent movement of the same prior to all of the heads being simultaneously locked to their shaft.

The present invention may be embodied in other specific forms without departing from the spirit or essential attributes thereof and, accordingly, reference should be made to the appended claims, rather than to the foregoing specification, as indicating the scope of the invention.

I claim:

1. In a slitter scorer comprising:

(a) a shaft, a plurality of heads slideable along said shaft, (b) a covering having an arcuate friction drag surface on its outer periphery, said surface having a centrally disposed flat thereon, said drag surface projecting in a radial direction with respect to the periphery of said shaft for a predetermined distance into contact with said heads, spring means biasing said drag surface radially inwardly, means for adjusting the radial distance of the outer periphery of said drag surface relative to the longitudinal axis of said shaft within fixed limits and against the bias of said spring means, (c) a rigid body extending longitudinally of said shaft and guided by said shaft for radial movement, the inner periphery of said covering being fixedly secured to the outer periphery of said body, (d) locking means including an expandable chamber disposed radially inwardly of said body for simultaneously locking all heads to said shaft by moving said body and drag surface radially outwardly.

2. In a slitter scorer in accordance with claim 1 including means carried by said body and surrounding at least a portion of said spring means for cooperation with means connected to the shaft for defining one end of said fixed limits.

3. Apparatus for supporting rotary tools comprising:

a rotatable shaft, a plurality of tool heads slideable therealong for operating on a moving web, said shaft having a longitudinally extending peripheral groove, a rigid body disposed within said groove and guided by said groove for movement in a radial direction, the exposed portion of said body being provided with a resilient covering for frictionally retarding movement of said tool heads, the outer surface of said covering being arcuate and having a centrally disposed flat thereon, spring means biasing said body radially inward, expandable chamber means disposed in said groove for urging said body radially outwardly into locking contact with each of said heads upon pressurization of said chamber means, and adjustable means carried by said body and in contact with said shaft for adjusting the radial distance of the outer surface of said covering relative to the longitudinal axis of said shaft so that said surface may project beyond the periphery of said shaft while said expandable chamber means is unpressurized.

4. An apparatus of the type described having a rotatable shaft, a plurality of heads slideable along said shaft, the improvement comprising:

(a) Locking means including an expandible chamber means extending along a central portion of said shaft for simultaneously locking all heads to said shaft when said chamber means is pressurized, said locking means including a friction drag surface projecting in a radial direction with respect to the periphery of said shaft for a predetermined distance into contact with said heads, a portion of the outer periphery of said drag surface being arcuate and having a radius of curvature which is substantially equal to the radius of curvature of said shaft, an exposed flat on said arcuate periphery of said drag surface and extending along said drag surface parallel to the side edges of said drag surface so as to provide a gap between said drag surface and the inner periphery of the heads whereby said friction drag surface may deform into said gap when said chamber means is pressurized, said drag surface being secured to a rigid metal body juxtaposed to said chamber means, and (b) means associated with said shaft and rigid metal body while being independent from said chamber means for adjusting the radial distance of the outer periphery of said drag surface relative to the longitudinal axis of said shaft within fixed limits.

5. Apparatus in accordance with claim 4 wherein said chamber means is a tube secured at one end to a metal adapter to facilitate introduction of a pressurized motive fluid into said chamber means.

6. Apparatus in accordance with claim 5 wherein said tube is rectangular in cross-section and encased by mutually perpendicular surfaces in its expanded and contracted positions.

7. Apparatus in accordance with claim 4 including spring means biasing said drag surface radially inwardly of said shaft, screw means threaded to said body for adjusting said drag surface in a radial direction, and means for limiting the extent of adjustment in a radially outward direction.

8. Apparatus in accordance with claim 7 wherein said limiting means surrounds a portion of said spring means.

9. Apparatus in accordance with claim 4 including a member radially outwardly of spring means which is biasing said body radially inwardly of said shaft, said member cooperating with means connected to the shaft for defining one end of said fixed limits.

10. Apparatus in accordance with claim 4 wherein the ratio of the width of the flat to the diameter of the shaft is between about 0.077 to 0.115.

11. Apparatus in accordance with claim 10 wherein said drag surface is made of polyurathane having a durometer of about 50.

* * * * *